Patented Apr. 27, 1948

2,440,349

UNITED STATES PATENT OFFICE 2,440,349

PROCESS FOR PREPARING AN ALKYLOL-AMIDE OF A TRIHYDROXYSTEARIC ACID

Benjamin B. Schaeffer, Upper Darby, Pa., assignor to United States of America as represented by the Secretary of Agriculture No Drawing. Application November 14, 1944, Serial No. 563,420

4 Claims. (Cl. 260—404)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates in general to derivatives of hydroxy fatty acids, and more particularly to the preparation of new compounds from hydroxy acids, typified as substituted amides of hydroxy fatty acids, which are useful as emulsifying agents and stabilizers.

The object of this invention is to provide new compounds in the form of substituted amides of hydroxy fatty acids. These compounds are generally useful as surface-active agents, such as emulsifying agents.

The compounds of this invention may be formed by chemical reaction between monohydroxy or polyhydroxy fatty acids and amino compounds, preferably alkylol amines, involving interaction of the carboxyl groups of said hydroxy fatty acids and the amino hydrogen atom of said amines. In this chemical reaction, water is formed as a by-product and the resulting compounds are in character substituted amides having highly desirable surface-active properties.

The hydroxy fatty acids suitable for the preparation of these compounds may be obtained from a variety of sources, one of these being oleic acid. To prepare a monohydroxy fatty acid, oleic acid is sulfated with concentrated sulfuric acid and subsequently hydrolyzed to yield a mixture of hydroxylated derivatives. The product prepared in this manner is mainly a mixture of monohydroxystearic acids comprising 10-hydroxystearic acid and 9-hydroxystearic acid and their isomers. A material very satisfactory for our purpose can be obtained by one crystallization of the crude hydrolysis product from an inexpensive solvent such as gasoline, kerosene, petroleum ether, petroleum naphtha or acetone, or a combination of some of these solvents. The 10-hydroxystearic acid and 9-hydroxystearic acid, which are important constituents present in the product obtained by sulfation and subsequent hydrolysis of oleic acid, may be designated by the following formulas, respectively:

$$CH_3(CH_2)_7CH(CH_2)_8COOH$$
$$\phantom{CH_3(CH_2)_7C}|\phantom{H(CH_2)_8COOH}$$
$$\phantom{CH_3(CH_2)_7CH(}OH$$

$$CH_3(CH_2)_8CH(CH_2)_7COOH$$
$$\phantom{CH_3(CH_2)_8C}|\phantom{H(CH_2)_7COOH}$$
$$\phantom{CH_3(CH_2)_8CH(}OH$$

The mixture of hydroxystearic acids, which include the above designated isomeric forms, will hereafter be referred to simply as monohydroxystearic acid.

Another hydroxy fatty acid suitable for the preparation of these new compounds is obtainable from hydrogenated castor oil, a commercially available material, which is saponified and acidified to yield 12-hydroxystearic acid represented by the formula $$CH_3(CH_2)_5CH(CH_2)_{10}COOH$$
$$\phantom{CH_3(CH_2)_5C}|\phantom{H(CH_2)_{10}COOH}$$
$$\phantom{CH_3(CH_2)_5CH(}OH$$

Other suitable hydroxy fatty acids include the dihydroxystearic acids obtainable from oleic acid by oxidation with various oxidizing agents, among which may be cited hydrogen peroxide in glacial acetic acid, perbenzoic acid, peracetic acid, or aqueous alkaline potassium permanganate. An example of such a dihydroxy fatty acid is 9,10-di-hydroxystearic acid, the formula of which is $$CH_3(CH_2)_7CHCH(CH_2)_7COOH$$
$$\phantom{CH_3(CH_2)_7C}|\phantom{HCH}\backslash\phantom{(CH_2)_7COOH}$$
$$\phantom{CH_3(CH_2)_7C}OH\phantom{CH}OH$$

Still other hydroxy fatty acids which may be used for the preparation of the new compounds include the trihydroxystearic acids obtained by the oxidation and subsequent hydrolysis of castor oil or the fatty acids therefrom. Suitable oxidizing agents for this purpose include hydrogen peroxide in glacial acetic acid, perbenzoic acid, peracetic acid, and aqueous alkaline potassium permanganate. In this case, the hydroxylated derivative is 9,10,12-trihydroxystearic acid having the following formula:

$$CH_3(CH_2)_5CHCH_2CHCH(CH_2)_7COOH$$
$$\phantom{CH_3(CH_2)_5C}|\phantom{HCH_2CH}|\phantom{CH}\backslash\phantom{(CH_2)_7COOH}$$
$$\phantom{CH_3(CH_2)_5C}OH\phantom{CH_2}OH\phantom{CH}OH$$

Amines of the type that are in the scope of this invention react readily with hydroxy fatty acids to form substituted amides by the mechanism referred to previously. Among the amino compounds found suitable for this reaction are those known commercially as alkylol amines. They are manufactured by the catalytic reduction of nitrohydroxy compounds which, in turn, are produced by the interaction of nitroparaffins and aldehydes. Specific examples of these compounds are 2-amino-2-methyl-1-propanol, 2-amino-2-methyl-1,3-propanediol, 2-amino-2-ethyl-1,3-propanediol, 2-amino-2-isopropyl-1,3-propanediol, 2-amino-1-butanol, and 2-amino-2-methylol-1,3-propanediol. The important feature of these amines is the presence of a reactive amino hydrogen atom, as well as of one or more ydroxyl groups, the former being necessary for
the chemical combination and the latter for the
mpartation of desirable properties to the products disclosed in this invention. It is to be understood, however, that this invention is not limited
to the use of the particular amino compounds
named, but includes all amines capable of reacting to form the new compounds referred to
herein.

These new compounds are conveniently prepared by adding the hydroxy fatty acid to the
amino compound in substantially equal molecular proportions in the presence of a suitable solvent. The solution is then heated at the temperature of reflux, for a period of time sufficient
for the separation of an equivalent quantity of
water, thus indicating essential completion of the
desired reaction. A suitable device useful in carrying out the reaction consists of a graduated
water-trap connected to the reflux condenser,
which collects the water as formed and allows
the solvent to return to the reaction flask. The
selection of a suitable solvent depends upon the
particular reactants used and upon the temperature required to accomplish the desired reaction.
Solvents of the aromatic type which are not
miscible with water are very effective for this
purpose. For example, benzol, toluol, xylol, mesitylene and cymene, have boiling points from
80° to 176° C. and thus permit a wide selection
of temperatures at which to conduct the reaction.
The solvent is then distilled from the product,
which is obtained as a white, waxlike solid readily dispersible in aqueous solution. The last
traces of solvent may be removed by blowing with
steam and evaporating to dryness. If steam distillation is necessary, the product may be used
directly in aqueous solution in any desired concentration for those applications where this procedure is suitable.

The reaction between monohydroxy fatty acids
and amines of the type described forms essentially compounds of the following general formula:

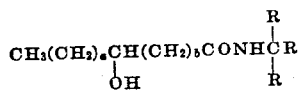

in which R represents either hydrogen, a monovalent alkyl radical, or an alkylol radical, and $a$
and $b$ are integers.

The reaction between a dihydroxy fatty acid
and an amine of the type described, forms essentially compounds of the following general formula:

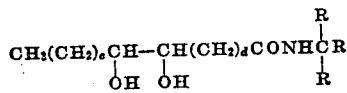

in which R has the same significance as defined
above, and $c$ and $d$ are integers.

The reaction between a trihydroxy fatty acid
and an amine forms essentially a compound having the following general formula:

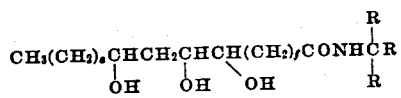

in which R has the same significance as in the
previous type formulas, and $e$ and $f$ are integers.

The following examples illustrate the preparation of these new compounds and the manner
in which they may be applied in practice.

*Example 1*

Twenty parts of monohydroxystearic acid (a
mixture of 9-hydroxystearic acid, 10-hydroxystearic acid, and their isomers) were added to six
parts of 2-amino-2-methyl-1-propanol in the
presence of xylene and heated at the reflux temperature until 1.2 parts of water had separated.
The xylene was then removed by distillation at
reduced pressure, and the reaction product, a
mixture of monohydroxy tertiary butyl monohydroxy stearamides, was recovered as a tan-colored, waxlike solid which melted at 62.5°–63° C.
This material was found to be readily dispersible
in water with excellent foaming properties.

It has been found that products of this type
exhibit considerable versatility as efficient emulsifying agents. They are useful for the preparation of exceptionally stable water dispersions of
paraffin and vegetable waxes, mineral and vegetable oils, water emulsion paints, varnishes and
resins. They are very effective solubilizing agents
for making uniform casein emulsions for paint
formulations and also will disperse insoluble powders in aqueous medium. Their usefulness further extends to printing inks for pigment wetting
and the preparation of water-type inks.

As an illustrative example of a water-in-oil
type of emulsion, five parts of the compound
made from monohydroxystearic acid and 2-amino-2-methyl-1-propanol, as described above,
were dissolved in 50 parts of light mineral oil with
stirring, and to the hot solution was added slowly
100 parts of hot water. This resulted in a stable
emulsion of uniform consistency.

For the preparation of an oil-in-water emulsion,
a 10 percent aqueous solution was made by dissolving ten parts of the emulsifier in 90 parts of
hot water with stirring, and then adding 50 parts
of 1:1 linseed oil-dammar varnish. This emulsion was stable and showed no signs of breaking
after long standing.

*Example 2*

Twenty parts of monohydroxystearic acid (a
mixture of 9-hydroxystearic acid, 10-hydroxystearic acid, and their isomers) and seven parts
of 2-amino-2-methyl-1,3-propanediol were heated
together in solution of xylene at the temperature
of reflux. After 1.2 parts of water had separated,
the solvent was removed by distillation at reduced
pressure and the product, a mixture of dihydroxy
tertiary butyl monohydroxystearamides, was obtained as a tan-colored, water soluble, waxlike
solid which melted at 50.5°–51.5° C.

In the preparation of a casein dispersion, two
parts of the above compound were dissolved in 50
parts of water, and to this solution was added,
with rapid stirring, five parts of granular casein.
Agitation was continued until the casein was completely dispersed and 0.4 part of formaldehyde
(35% solution) was added as a preservative.

Casein-water emulsion paint was formulated
by adding to the above well-stirred casein dispersion two parts of boiled linseed oil, two parts
of varnish, and three parts of white spirits. The
paint prepared in this manner had good brushing and water-resistant properties.

A smooth wax dispersion was made using the
amide prepared from monohydroxystearic acid
and 2-amino-2-methyl-1,3-propanediol. Thirty-five parts of paraffin wax (M. P. 56°–58° C.) and
ten parts of stearic acid were melted together, and
five parts of the amide were stirred into this hot
mixture, forming a hard wax upon cooling to room temperature. This wax was then stirred into three parts of hot water, the temperature of which is above the melting point of the wax, forming a creamy dispersion of uniform consistency when cool.

Example 3

Twenty parts of monohydroxystearic acid (a mixture of 9-hydroxystearic acid, 10-hydroxystearic acid, and their isomers) and eight parts of 2-amino-2-methylol - 1,3 - propanediol were heated together with xylene as solvent, forming the corresponding substituted amide. After removal of the solvent, the product, a mixture of trihydroxy tertiary butyl monohydroxystearamides, was obtained as a waxlike solid which melted at 55.5°–56.5° C.

An aqueous casein dispersion was made, using the same procedure as described in Example 2. Casein emulsion paint was formulated by adding to the casein water dispersion two parts of boiled linseed oil, two parts of varnish, three parts of white spirits, and five parts of zinc oxide.

Carbon black was easily dispersed in water with the aid of this emulsifier. 2.5 parts of the product made from monohydroxystearic acid and 2-amino-2-methylol-1,3-propanediol were dissolved in fifty parts of water, and then five parts of carbon black were slowly added with vigorous stirring. In making dispersions of this type involving insoluble powders, grinding in a colloid or ball mill is desirable.

Example 4

Twenty-one parts of 9,10-dihydroxystearic acid were added to eight parts of 2-amino-2-methylol-1,3-propanediol in solution of xylene and boiled at the reflux temperature forming the corresponding substituted amide. This product, trihydroxy tertiary butyl 9,10-dihydroxystearamide, was a waxlike solid.

An oil-in-water emulsion was made by adding fifty parts of mineral oil to a solution of five parts of this emulsifier in fifty parts of hot water. This resulted in a stable dispersion of uniform consistency.

Example 5

Twenty parts of 12-hydroxystearic acid and six parts of 2-amino-2-methyl-1-propanol were reacted together by the method described in Example 1, forming the corresponding amide, monohydroxytertiary butyl 12-hydroxystearamide, as a waxlike substance.

An oil-in-water emulsion was made by stirring fifty parts of five-percent aqueous solution of this emulsifier into fifty parts of light mineral spirits (B. P. 102°–129° C.), forming a dispersion of thick consistency which was capable of being further diluted with water.

Example 6

Twenty-two parts of 9,10,12-trihydroxystearic acid were heated with seven parts of 2-amino-2-methylol-1,3-propanediol to form the corresponding substituted amide according to the procedure described in Example 1. The product thus formed, trihydroxy tertiary butyl 9,10,12-trihydroxystearamide, was a white, waxlike solid, readily dispersible in water.

An oil-in-water emulsion was made by adding fifty parts of mineral oil to a solution of five parts of this emulsifier in fifty parts of hot water, producing a stable emulsion of uniform consistency.

Having thus described my invention, I claim:

1. A process of preparing an alkylolamide of a trihydroxystearic acid, comprising reacting the trihydroxystearic acid with an alkylol amine in the presence of an aromatic hydrocarbon having a boiling point of about from 80° C. to 176° C., at the temperature of reflux, with continuous removal of water formed and until a sufficient quantity of water has separated to indicate essential completion of the reaction.

2. A process of preparing an alkylolamide of 9,10,12-trihydroxystearic acid, comprising reacting 9,10,12-trihydroxystearic acid with an alkylol amine in the presence of an aromatic hydrocarbon having a boiling point of from about 80° C. to 176° C., at the temperature of reflux, with continuous removal of water formed and until a sufficient quantity of water has separated to indicate essential completion of the reaction.

3. A process of preparing a hydroxy tertiary butyl trihydroxystearamide, comprising reacting trihydroxystearic acid with a hydroxy tertiary butyl amine in the presence of an aromatic hydrocarbon having a boiling point of about from 80° C. to 176° C., at the temperature of reflux, with continuous removal of water formed and until a sufficient quantity of water has separated to indicate essential completion of the reaction.

4. A process of preparing trihydroxy tertiary butyl 9,10,12-trihydroxystearamide, comprising reacting 9,10,12-trihydroxystearic acid with 2-amino-2-methylol-1,3-propanediol in the presence of an aromatic hydrocarbon having a boiling point of about from 80° C. to 176° C., at the temperature of reflux, with continuous removal of water formed and until a sufficient quantity of water has separated to indicate essential completion of the reaction.

BENJAMIN B. SCHAEFFER.

REFERENCES CITED

The following references are of record in the file of this patent:

UNITED STATES PATENTS

| Number | Name | Date |
|---|---|---|
| Re. 21,530 | Kritchevsky | Aug. 13, 1940 |
| 2,002,613 | Orthner et al. | May 28, 1935 |
| 2,078,652 | De Groote et al. | Apr. 27, 1937 |
| 2,111,402 | Muller | Mar. 15, 1938 |
| 2,167,347 | De Groote et al. | July 25, 1939 |
| 2,280,830 | Johnson | Apr. 28, 1942 |
| 2,343,431 | Wells et al. | Mar. 7, 1944 |
| 2,356,408 | Kelley | Aug. 22, 1944 |
| 2,373,250 | Lycan et al. | Apr. 10, 1945 |
| 2,394,833 | Young et al. | Feb. 12, 1946 |
| 2,402,584 | Searle | June 25, 1946 |